US011590961B2

United States Patent
Arima et al.

(10) Patent No.: US 11,590,961 B2
(45) Date of Patent: Feb. 28, 2023

(54) VEHICLE CONTROL APPARATUS, VEHICLE CONTROL METHOD, AND VEHICLE CONTROL SYSTEM

(71) Applicant: Hitachi Automotive Systems, Ltd., Hitachinaka (JP)

(72) Inventors: Hidetoshi Arima, Sagamihara (JP); Satoshi Kashiwamura, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/637,310

(22) PCT Filed: Sep. 3, 2018

(86) PCT No.: PCT/JP2018/032536
§ 371 (c)(1),
(2) Date: Feb. 7, 2020

(87) PCT Pub. No.: WO2019/058940
PCT Pub. Date: Mar. 28, 2019

(65) Prior Publication Data
US 2020/0247394 A1 Aug. 6, 2020

(30) Foreign Application Priority Data
Sep. 20, 2017 (JP) .............................. JP2017-180314

(51) Int. Cl.
B60W 30/02 (2012.01)
(52) U.S. Cl.
CPC ......... B60W 30/02 (2013.01); *B60W 2520/26* (2013.01); *B60W 2552/40* (2020.02); *B60W 2720/26* (2013.01)
(58) Field of Classification Search
CPC ............ B60W 30/02; B60W 2552/40; B60W 2520/26; B60W 2720/26; B60T 8/17616; B60T 2240/04; B60T 7/22; B60T 8/96
See application file for complete search history.

(56) References Cited

U.S. PATENT DOCUMENTS 5,471,390 A * 11/1995 Sasaki .................... B60K 23/04
303/DIG. 6
5,762,157 A * 6/1998 Uehara ................. B60W 10/20
180/197
(Continued)

FOREIGN PATENT DOCUMENTS

FR       2698332 A1 *  5/1994  .......... B60T 8/17616
JP   2003118612 A  *  4/2003
(Continued)

OTHER PUBLICATIONS

JP2003118612 Translation (Year: 2003).*
(Continued)

*Primary Examiner* — Jeff A Burke
*Assistant Examiner* — Kyle T Johnson
(74) *Attorney, Agent, or Firm* — Crowell & Moring LLP

(57) ABSTRACT

The present invention provides a vehicle control apparatus, a vehicle control method, and a vehicle control system capable of optimizing balance between a target tire lateral force and a target tire longitudinal force. A vehicle control apparatus outputs an instruction for achieving an optimal slip ratio corresponding to a minimum value of a sum of a first difference and a second difference to an actuator regarding braking/driving of a vehicle. The first difference is a difference between a tire lateral force and a target tire lateral force with respect to an arbitrary slip ratio in a correlative relationship between a slip ratio and the tire lateral force of a tire of a wheel portion. The second difference is a difference between a tire longitudinal force and a target tire longitudinal force with respect to the arbitrary slip ratio in a correlative relationship between the slip ratio and the tire longitudinal force.

15 Claims, 8 Drawing Sheets

(56) References Cited

U.S. PATENT DOCUMENTS

| | | | | |
|---|---|---|---|---|
| 6,266,601 | B1* | 7/2001 | Soga | B62D 8/172 |
| | | | | 180/197 |
| 6,308,126 | B2* | 10/2001 | Yokoyama | B60W 10/184 |
| | | | | 303/146 |
| 9,463,782 | B2* | 10/2016 | Kikawa | B60T 8/1761 |
| 10,144,293 | B2* | 12/2018 | Suzuki | B60T 8/17636 |
| 2003/0093208 | A1* | 5/2003 | Hessmert | B60T 8/17551 |
| | | | | 701/72 |
| 2005/0065697 | A1* | 3/2005 | Niino | B60T 8/1755 |
| | | | | 701/71 |
| 2008/0144985 | A1* | 6/2008 | Joki | F16C 41/007 |
| | | | | 384/448 |
| 2010/0077847 | A1* | 4/2010 | Joe | B60W 40/101 |
| | | | | 73/146 |
| 2011/0066326 | A1* | 3/2011 | Kashiwamura | B60G 17/0195 |
| | | | | 701/38 |
| 2012/0130616 | A1* | 5/2012 | Caspari | B60W 10/184 |
| | | | | 701/83 |
| 2014/0005894 | A1* | 1/2014 | Aoki | B62D 6/001 |
| | | | | 701/43 |
| 2015/0246675 | A1* | 9/2015 | Matsunaga | B60W 30/02 |
| | | | | 701/70 |
| 2017/0297573 | A1* | 10/2017 | Fraser | B60W 10/06 |
| 2018/0273046 | A1* | 9/2018 | Berntorp | B60W 40/12 |
| 2020/0247394 | A1* | 8/2020 | Arima | B60T 8/17616 |

FOREIGN PATENT DOCUMENTS

| | | | | |
|---|---|---|---|---|
| JP | 2008100579 | A | * 5/2003 | |
| JP | 3621842 | B2 | * 2/2005 | B60T 8/172 |
| JP | 2008-100579 | A | 5/2008 | |
| JP | 2008-247067 | A | 10/2008 | |
| JP | 2010074957 | A | * 4/2010 | |

OTHER PUBLICATIONS

JP2008100579 Translation (Year: 2008).*
Google Search string (Year: 2020).*
FR-2698332-A1 Translation (Year: 1994).*
JP-3621842-B2 Translation (Year: 2005).*
JP-2010074957-A Translation (Year: 2010).*
International Search Report (PCT/ISA/210) issued in PCT Application No. PCT/JP2018/032536 dated Nov. 27, 2018 with English translation (four (4) pages).
Japanese-language Written Opinion (PCT/ISA/237) issued in PCT Application No. PCT/JP2018/032536 dated Nov. 27, 2018with English translation (11 pages).

* cited by examiner

VEHICLE CONTROL APPARATUS, VEHICLE CONTROL METHOD, AND VEHICLE CONTROL SYSTEM

TECHNICAL FIELD

The present invention relates to a vehicle control apparatus, a vehicle control method, and a vehicle control system.

BACKGROUND ART

PTL 1 discusses a technique that determines a target slip ratio of each wheel based on a target tire lateral force and a target tire longitudinal force of each wheel, and controls an actuator so as to achieve the determined target slip ratio.

CITATION LIST

Patent Literature

[PTL 1] Japanese Patent Application Public Disclosure No. 2008-247067

SUMMARY OF INVENTION

Technical Problem

However, the above-described conventional configuration involves such a problem that balance between the target tire lateral force and the target tire longitudinal force cannot be optimized because there is a difference between a tire lateral force characteristic and a tire longitudinal force characteristic with respect to the slip ratio.

One of objects of the present invention is to provide a vehicle control apparatus, a vehicle control method, and a vehicle control system capable of optimizing the balance between the target tire lateral force and the target tire longitudinal force.

Solution to Problem

According to one aspect of the present invention, a vehicle control apparatus outputs an instruction for achieving an optimal slip ratio corresponding to a minimum value of a sum of a first difference and a second difference to an actuator regarding braking/driving of a vehicle. The first difference is a difference between a tire lateral force and a target tire lateral force with respect to an arbitrary slip ratio in a correlative relationship between a slip ratio and the tire lateral force of a tire of a wheel portion. The second difference is a difference between a tire longitudinal force and a target tire longitudinal force with respect to the arbitrary slip ratio in a correlative relationship between the slip ratio and the tire longitudinal force.

Therefore, the present invention can optimize the balance between the target tire lateral force and the target tire longitudinal force.

DESCRIPTION OF EMBODIMENTS

First Embodiment

Figure 1:
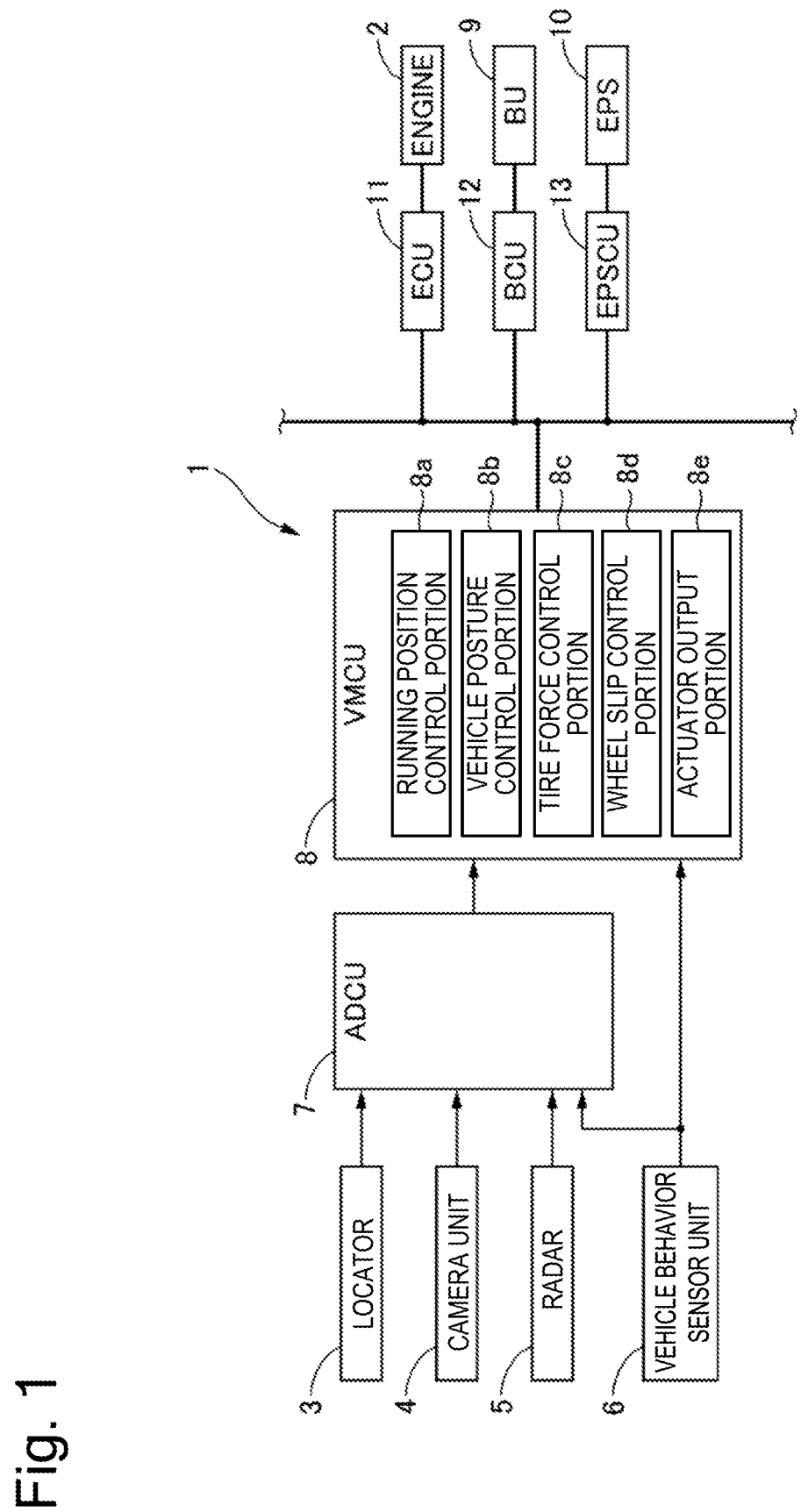
FIG. 1 illustrates a configuration of a vehicle control system 1 regarding autonomous driving according to a first embodiment.

FIG. 1 illustrates a configuration of a vehicle control system 1 regarding autonomous driving according to a first embodiment.

The vehicle control system 1 is mounted on a vehicle that uses an engine 2 as a power source thereof. The vehicle control system 1 includes a locater 3, a camera unit 4, a radar 5, a vehicle behavior sensor unit (a vehicle behavior detection portion) 6, an autonomous driving control unit (hereinafter referred to as an ADCU) 7, and a vehicle motion control unit (a vehicle motion control apparatus, hereinafter referred to as a VMCU) 8.

The locater 3 includes a GNSS (Global Navigation Satellite System) receiver and an inertial sensor such as a gyroscope sensor. The locater 3 measures a position of a subject vehicle based on signals from a plurality of artificial satellites that is received by the GNSS receiver and a result of measurement by the inertial sensor. The position of the subject vehicle is defined to be a center of gravity of the vehicle, a geometric central point, or a center of a rear axle.

The camera unit 4 includes a stereo camera that images a predetermined range ahead of the subject vehicle with use of two CCDs. The camera unit 4 calculates a difference between images captured by the stereo camera to recognize an object (an obstacle) based on a baseline length, and calculates a distance to the object.

The radar 5 emits, for example, a millimeter wave from a transmission antenna to ahead of the subject vehicle. The radar 5 receives the millimeter wave reflected from the object with use of a reception antenna, and calculates the distance to the object.

The vehicle behavior sensor unit 6 is a unit integrally including sensors that detect vehicle behaviors such as a lateral acceleration, a longitudinal acceleration, a yaw rate, and a wheel speed, respectively.

The ADCU 7 estimates a current position of the subject vehicle from matching of the position of the subject vehicle measured by the locater 3 with a dynamic map. At this time, the ADCU 7 serves to improve estimation accuracy by recognizing a situation surrounding the subject vehicle based on the distance to the object that is calculated by the camera unit 4 and the radar 5 and referring to the situation surrounding the subject vehicle. Examples of the situation surrounding the subject vehicle include a curvature (a curvature radius) of a curve, a rotational angle, road information such as a start position, a moving object (a pedestrian, a bicycle, a motorcycle, a vehicle running ahead of the subject vehicle, a vehicle running in an adjacent traffic lane, and the like), and a stationary object (a dropped object on a road, a traffic light, a guardrail, a curb, a road sign, a road marking, a lane marking, a tree, and the like). The ADCU 7 outputs a destination input by a driver's switch operation or the like, the estimated current position of the subject vehicle and the surrounding situation to the VMCU 8.

The VMCU 8 generates a target trajectory of the subject vehicle and also outputs an instruction for realizing the target trajectory to respective control units (an engine control unit 13, a brake control unit 14, and an electric power steering control unit 15) of actuators (the engine 2, a brake unit 9, and an electric power steering apparatus 10) mounted on the subject vehicle. The engine control unit 13, the brake control unit 14, and the electric power steering control unit 15 control the actuators corresponding thereto according to the instruction output from the VMCU 8. The brake unit 9 can control a wheel cylinder hydraulic pressure at each of wheels (a wheel portion) represented by a sideslip prevention device, and individually control a braking torque to provide to each of the wheels. The power steering apparatus 10 can turn front wheels, which are steered wheels, to an arbitrarily angle with use of an output torque of an electric motor.

The VMCU 8 includes a running position control portion 8a, a vehicle posture control portion 8b, a tire force control portion 8c, a wheel slip control portion 8d, and an actuator output portion 8e.

The running position control portion 8a generates the target trajectory of the subject vehicle regarding the autonomous driving based on the destination and the current position. The target trajectory is a target trajectory point (a target position) of the subject vehicle after a forward gazing time (a forward gazing distance/vehicle speed). Further, the running position control portion 8a generates a target vehicle body speed at the generated target trajectory point. The running position control portion 8a calculates a target lateral force and a target longitudinal force of the vehicle for realizing the target trajectory point and the target vehicle body speed.

The vehicle posture control portion 8b corrects the calculated target lateral force and target longitudinal force of the vehicle based on the situation surrounding the subject vehicle (the obstacle or the like). Further, the vehicle posture control portion 8b generates a target yaw angle at the target trajectory point and calculates a target yaw moment that should be provided to the vehicle to realize the target yaw angle. The yaw angle is an angle formed between a longitudinal-axis direction of the subject vehicle and a reference-axis direction fixed on a road surface (for example, an x-axis direction in a coordinate system fixed on the road surface).

The tire force control portion (a target tire lateral force calculation portion and a target tire longitudinal force calculation portion) 8c calculates a target tire lateral force and a target tire longitudinal force of each of the wheels for realizing the corrected target lateral force, target longitudinal force, and target yaw moment of the vehicle. Now, assume that the target tire lateral force and the target tire longitudinal force are such values that the target lateral force of the vehicle and the target yaw moment of the vehicle are prioritized over the target longitudinal force of the vehicle. More specifically, the target tire lateral force and the target tire longitudinal force of each of the wheels are set in such a manner that deviations between the target lateral force and the target yaw moment and the actual lateral force and the actual yaw moment fall below a deviation between the target longitudinal force and the actual longitudinal force. As a result, both spin avoidance and line traceability can be realized at the same time. The tire force control portion 8c determines a task share assigned to each of the actuators (the engine 2, the brake control unit 9, and the electric power steering apparatus 10) for realizing the target tire lateral force and the target tire longitudinal force of each of the wheels, and generates a wheel turning instruction according to the task share assigned to the electric power steering apparatus 10.

The wheel slip control portion 8d calculates an optimal slip ratio of each of the wheels for realizing the determined task shares assigned to the engine 2 and the brake unit 9, and generates braking and driving force instructions for achieving the optimal slip ratio at each of the wheels. A method for calculating the optimal slip ratio will be described below.

The actuator output portion 8e outputs the generated wheel turning instruction to the electric power steering control unit 15, and outputs the generated braking and driving force instructions to the engine control unit 13 and the brake control unit 14.

Figure 2:
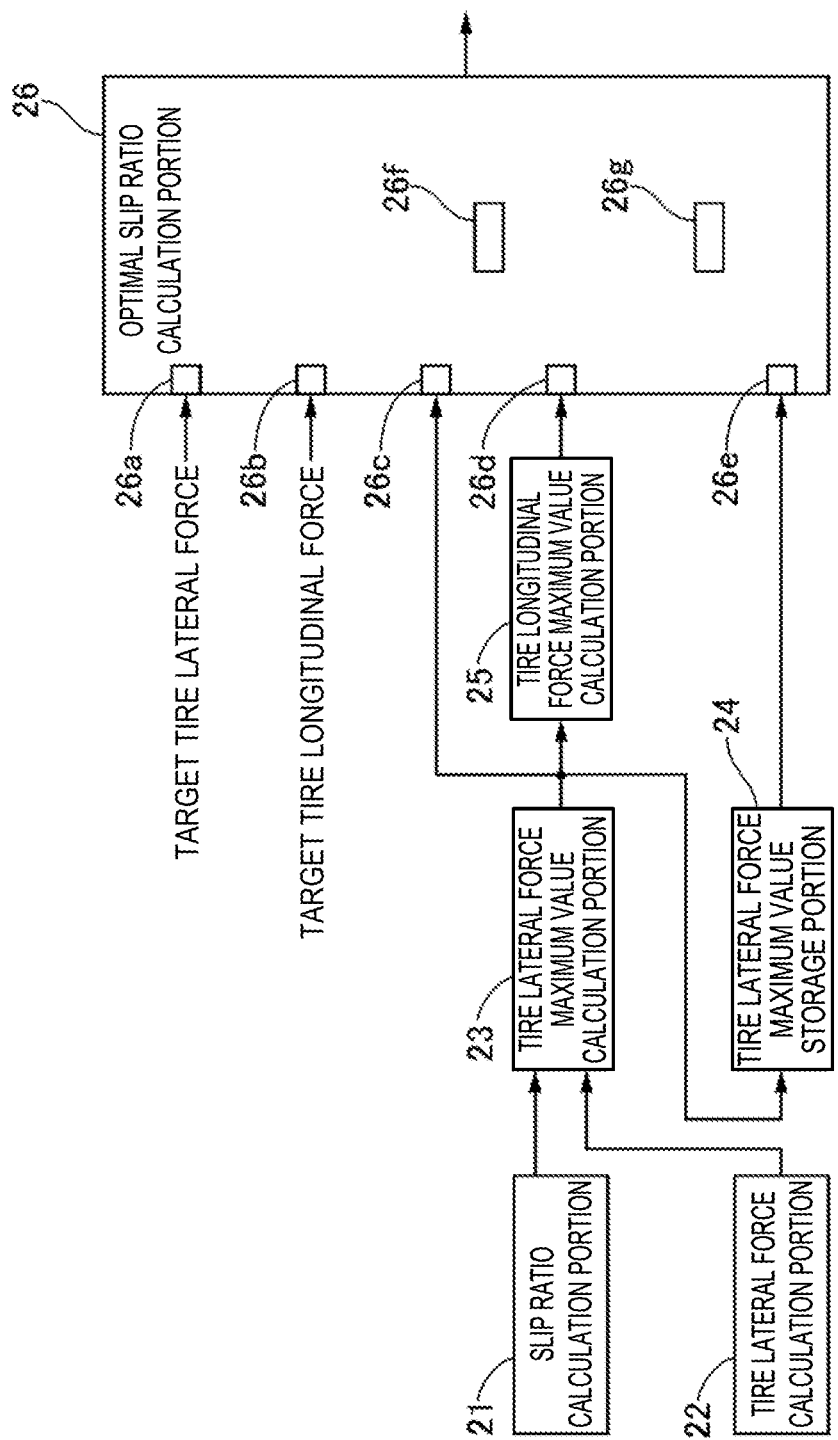
FIG. 2 is a control block diagram of a vehicle slip control portion 8d.

FIG. 2 is a control block diagram of the vehicle slip control portion 8d.

A slip ratio calculation portion 21 calculates the slip ratio of each of the wheels. The slip ratio is defined to be a value calculated by dividing an absolute value of a difference between the wheel speed and the vehicle body speed detected by the vehicle behavior sensor unit 6 by the vehicle body speed. The vehicle body speed is estimated from the wheel speed of each of the wheels. A highest value among the individual wheel speeds is selected as the vehicle body speed at the time of braking, and a lowest value among the individual wheel speeds is selected as the vehicle body speed at the time of acceleration.

A tire lateral force calculation portion 22 calculates the tire lateral force of each of the wheels with use of a two-wheel model of the vehicle based on the yaw rate, the lateral acceleration, and the longitudinal acceleration detected by the vehicle behavior sensor unit 6.

A tire lateral force maximum value calculation portion (a maximum tire lateral force calculation portion) 23 calculates a tire lateral force maximum value, which is a maximum tire lateral force that each of the wheels can generate, based on the slip ratio and the tire lateral force of each of the wheels. Details of a calculation method will be described below.

A tire lateral force maximum value storage portion 24 stores the calculated tire lateral force maximum value of each of the wheels as a tire lateral force maximum value stored value. The tire lateral force maximum value stored value is updated every time the tire lateral force maximum value of each of the wheels is calculated.

A tire longitudinal force maximum value calculation portion (a maximum tire longitudinal force calculation portion) 25 calculates a tire longitudinal force maximum value, which is a maximum tire longitudinal force that each of the wheels can generated, based on the tire lateral force maximum value of each of the wheels. Details of a calculation method will be described below.

An optimal slip ratio calculation portion 26 includes a target tire lateral force input portion 26*a*, a target tire longitudinal force input portion 26*b*, a tire lateral force maximum value input portion (a maximum tire lateral force input portion) 26*c*, a tire longitudinal force maximum value input portion (a maximum tire longitudinal force input portion) 26*d*, a tire lateral force maximum value stored value input portion (a stored maximum tire lateral force input portion) 26*e*, a tire lateral force difference calculation portion 26*f*, and a tire longitudinal force difference calculation portion 26*g*.

The target tire lateral force input portion 26*a* inputs the target tire lateral force of each of the wheels. The target tire longitudinal force input portion 26*b* inputs the target tire longitudinal force of each of the wheels. The tire lateral force maximum value input portion 26*c* inputs the tire lateral force maximum value of each of the wheels. The tire longitudinal force maximum value input portion 26*d* inputs the tire longitudinal force maximum value of each of the wheels. The tire lateral force maximum value stored value input portion 26*e* inputs the tire lateral force maximum value stored value of each of the wheels.

The tire lateral force difference calculation portion 26*f* calculates a first difference, which is an absolute value of a difference between the tire lateral force and the target tire lateral force at each slip ratio in a current tire lateral force characteristic, with respect to each of the wheels.

The tire longitudinal force difference calculation portion 26*g* calculates a second difference, which is an absolute value of the difference between the tire longitudinal force and the target tire longitudinal force at each slip ratio of the current tire longitudinal force characteristic, with respect to each of the wheels.

The optimal slip ratio calculation portion 26 calculates a slip ratio at which a sum of the first difference and the second difference is minimized as the optimal slip ratio with respect to each of the wheels. In the following description, a flow of processing for calculating the optimal slip ratio will be described with reference to FIG. 3.

Figure 3:
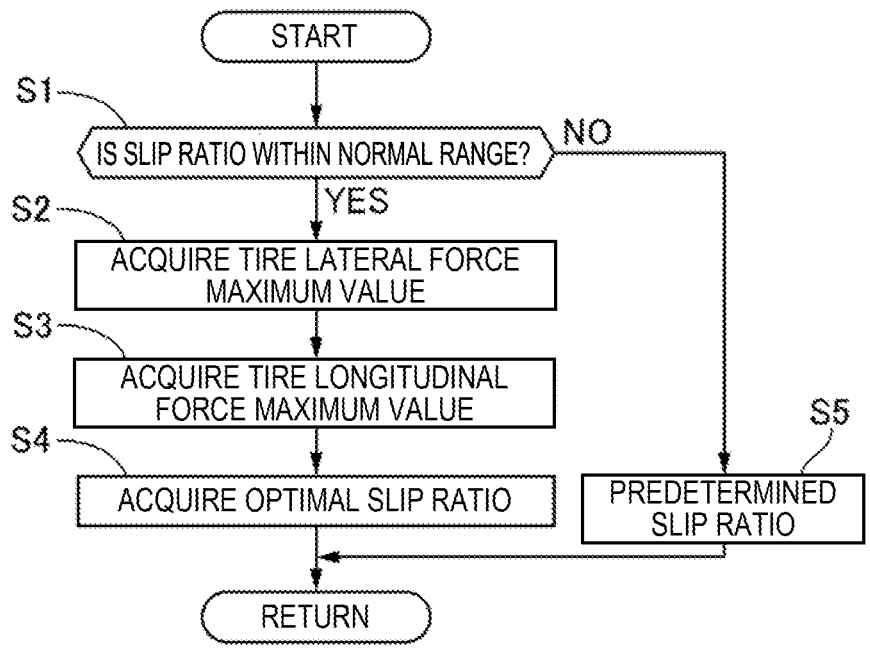
FIG. 3 is a flowchart illustrating a flow of processing for calculating an optimal slip ratio that is performed by a VMCU 8.

FIG. 3 is a flowchart illustrating the flow of the processing for calculating the optimal slip ratio that is performed by the VMCU 8. Processing in each of steps is performed with respect to all the wheels.

In step S1, the VMCU 8 determines whether the slip ratio calculated by the slip ratio calculation portion 21 falls within an expected normal range. If the determination in step S1 is YES, the processing proceeds to step S2. If the determination in step S1 is NO, the processing proceeds to step S5.

Figure 4:
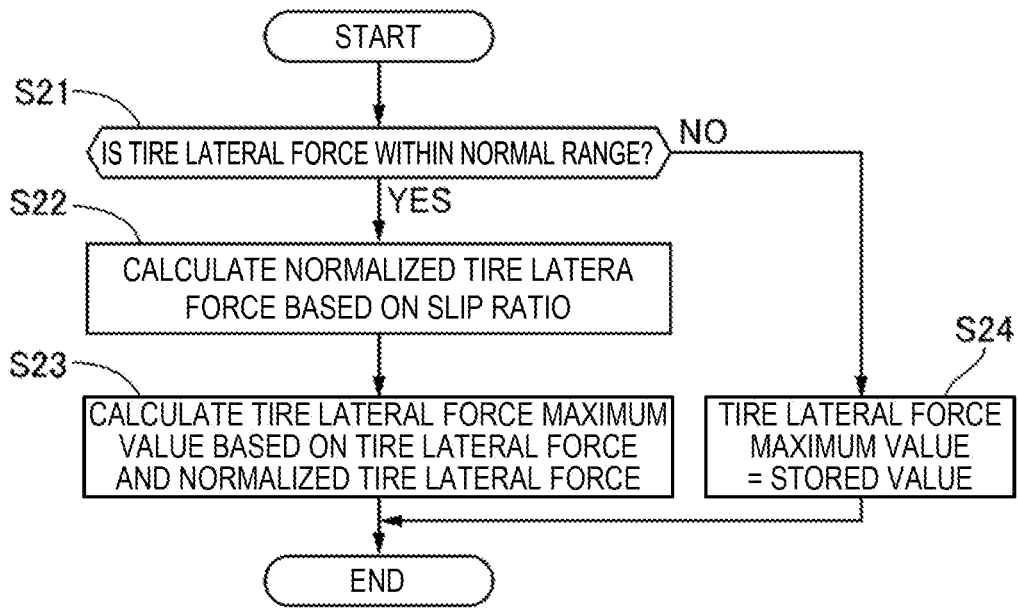
FIG. 4 is a flowchart illustrating a flow of processing for calculating a tire lateral force maximum value.

In step S2, the VMCU 8 calculates the tire lateral force maximum value. FIG. 4 is a flowchart illustrating a flow of processing for calculating the tire lateral force maximum value.

In step S21, the VMCU 8 determines whether the tire lateral force calculated by the tire lateral force calculation portion 22 falls within an expected normal range. If the determination in step S21 is YES, the processing proceeds to step S22. If the determination in step S21 is NO, the processing proceeds to step S24.

Figure 5:
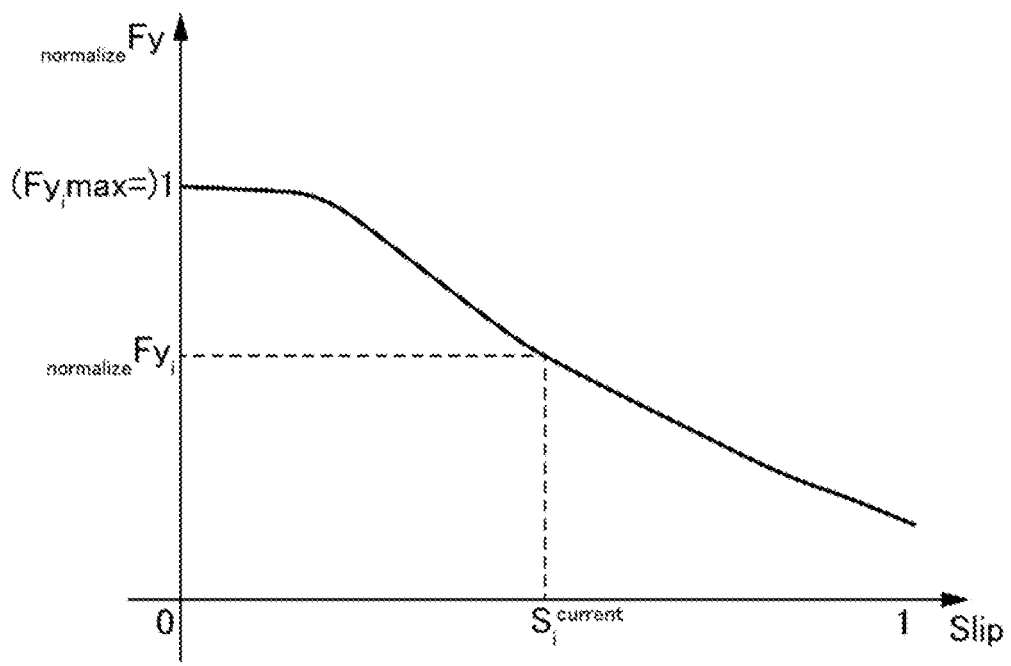
FIG. 5 illustrates one example of a slip ratio-tire lateral force characteristic normalization map.

In step S22, the VMCU 8 calculates a normalized tire lateral force by referring to a slip ratio-tire lateral force normalization characteristic map corresponding to a current tire slip angle based on the current slip ratio. FIG. 5 illustrates one example of the slip ratio-tire lateral force characteristic normalization map. This map indicates a relationship between the slip ratio S and the tire lateral force Fy normalized in such a manner that the tire lateral force maximum value Fyimax matches 1 from the slip ratio-tire lateral force characteristic map. The normalized tire lateral force normalizeFyi can be acquired from the current slip ratio Sicurrent by referring to this map.

In step S23, the VMCU 8 calculates the tire lateral force maximum value Fyimax with use of the following equation based on the current tire lateral force Fyicurrent and the normalized tire lateral force normalizeFyi. Fyimax=Fyicurrent/normalizeFyi In step S24, the VMCU 8 sets the tire lateral force maximum value stored value as the tire lateral force maximum value Fyimax.

In step S3, the VMCU 8 calculates the tire longitudinal force maximum value Fximax based on the tire lateral force maximum value Fyimax, hypothetically assuming that a tire frictional circle is a perfect circle. In other words, the VMCU 8 sets Fximax=Fyimax.

Figure 6:
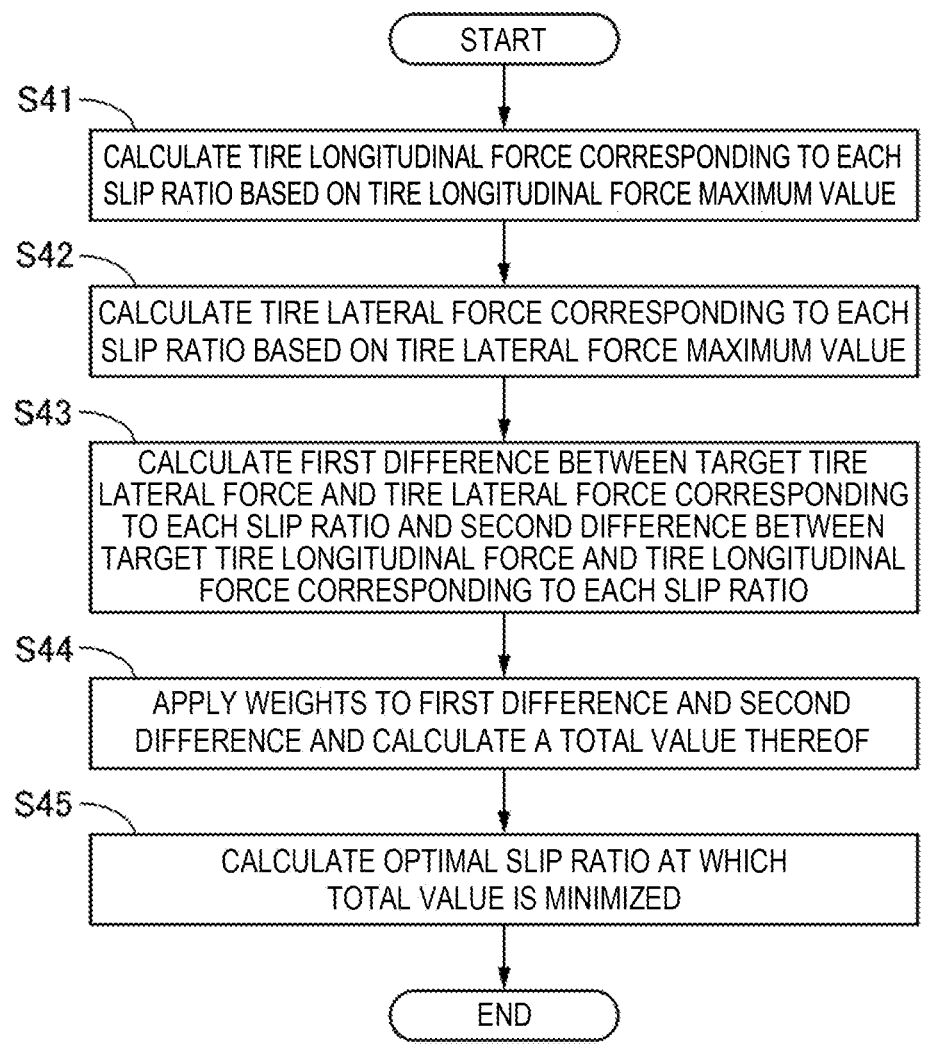
FIG. 6 is a flowchart illustrating the flow of the processing for calculating the optimal slip ratio.

In step S4, the VMCU 8 calculates the optimal slip ratio. FIG. 6 is a flowchart illustrating a flow of processing for calculating the optimal slip ratio.

Figure 7:
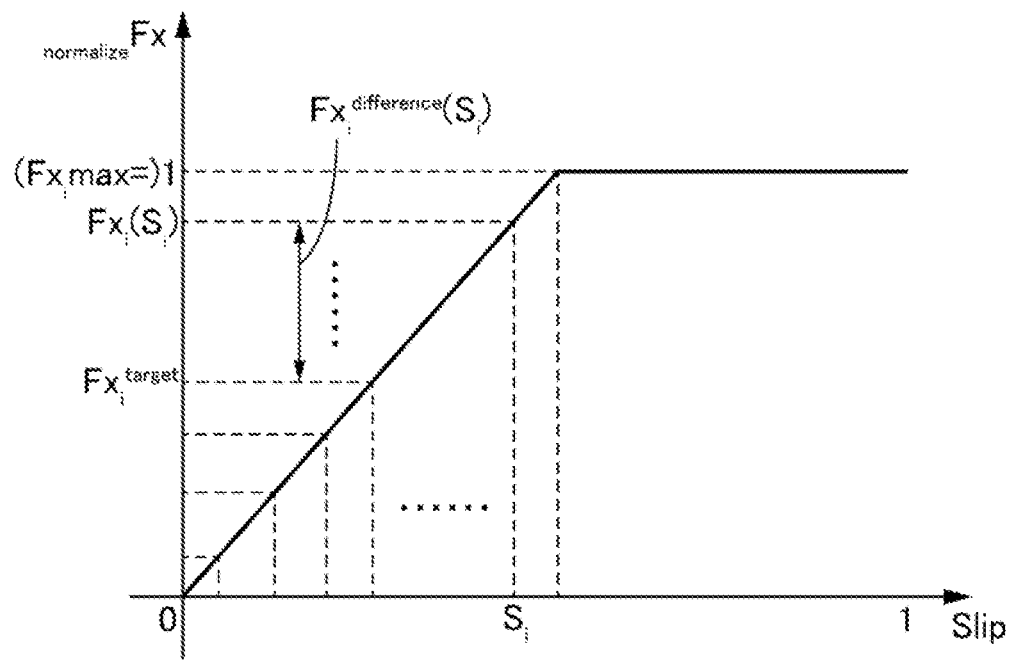
FIG. 7 illustrates one example of a slip ratio-tire longitudinal force characteristic normalization map.

In step S41, the VMCU 8 calculates the tire longitudinal force Fxi(Si) corresponding to each slip ratio Si by referring to the slip ratio-tire longitudinal force characteristic normalization map based on the tire longitudinal force maximum value Fximax as illustrated in FIG. 7.

Figure 8:
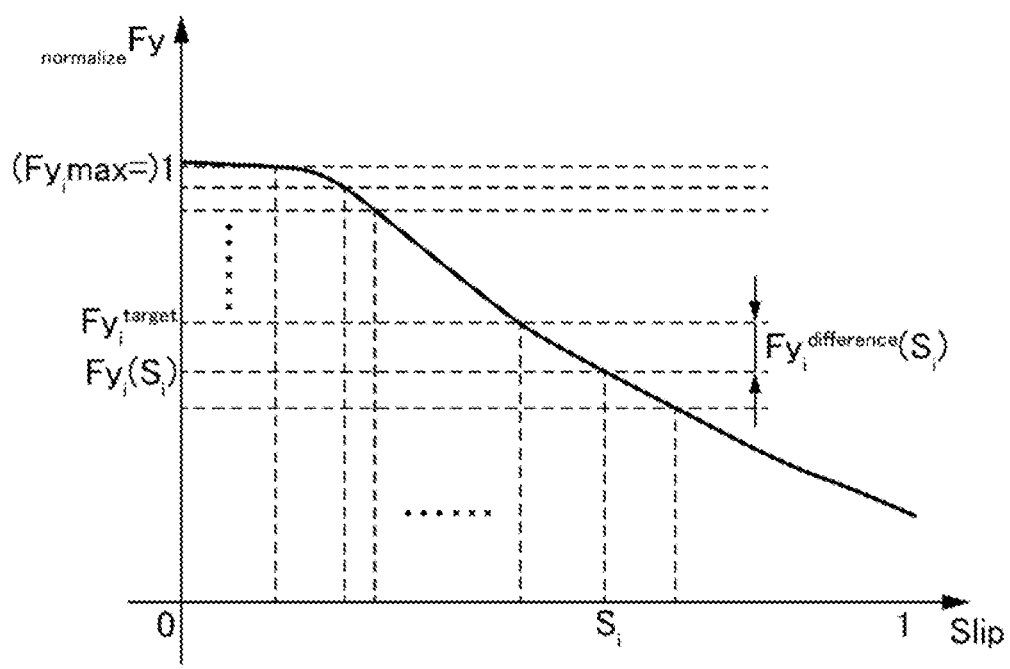
FIG. 8 illustrates one example of the slip ratio-tire lateral force characteristic normalization map.

In step S42, the VMCU 8 calculates the tire lateral force Fyi(Si) corresponding to each slip ratio Si with use of the slip ratio-tire lateral force characteristic normalization map based on the tire lateral force maximum value Fyimax as illustrated in FIG. 8.

Figure 9:
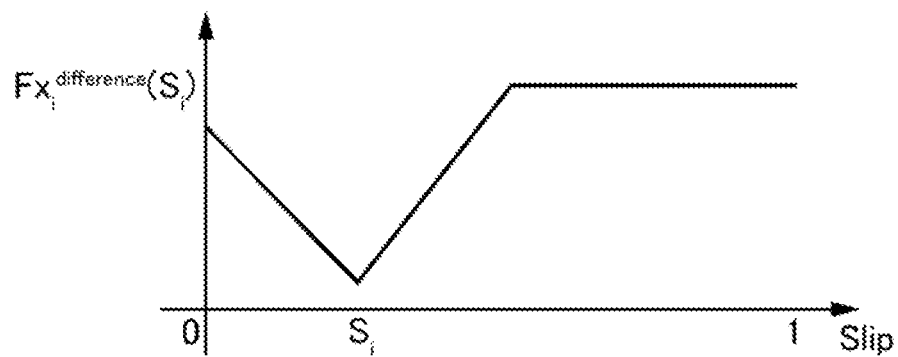
FIG. 9 illustrates one example of a second difference with respect to each slip ratio.

In step S43, the VMCU 8 calculates the second difference Fxidifference(Si), which is the absolute value |Fxi(Si)-Fxitarget| of the difference between the target tire longitudinal force Fxitarget and the tire longitudinal force Fxi(Si) corresponding to each slip ratio Si. FIG. 9 illustrates one example of the second difference with respect to each slip ratio.

Figure 10:
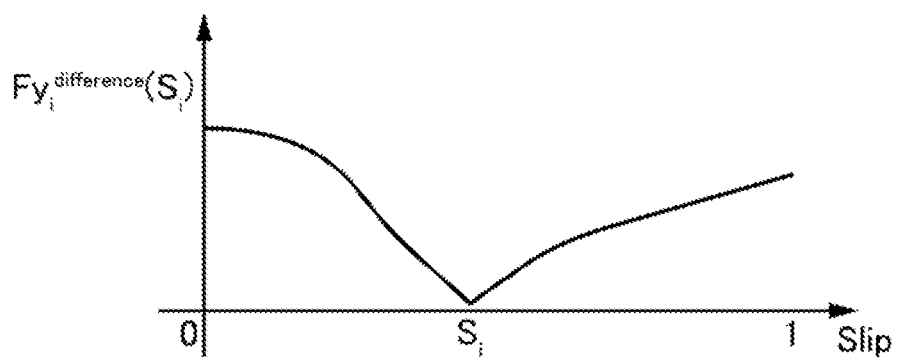
FIG. 10 illustrates one example of a first difference with respect to each slip ratio.

Further, the VMCU 8 calculates the first difference Fyidifference(Si), which is the absolute value |Fyi(Si)-Fyitarget| of the difference between the target tire lateral force Fyitarget and the tire lateral force Fyi(Si) corresponding to each slip ratio Si. FIG. 10 illustrates one example of the first difference with respect to each slip ratio.

In step S44, the VMCU 8 applies weights to the first difference Fyidifference(Si) and the second difference Fxidifference(Si), and calculates a total value Fidifference(Si) thereof.

$$\text{Fidifference}(Si)=\omega x \times \text{Fxidifference}(Si)+\omega y \times \text{Fyidifference}(Si)$$

Now, assume that a relationship $\omega x+\omega y=1$ is established between the weight $\omega x$ applied to the tire longitudinal force and the weight $\omega y$ applied to the tire lateral force. The weights $\omega x$ and $\omega y$ serve to determine the characteristic in the vehicle behavior, and can be preset according to what kind of vehicle is planned to be constructed. Further or alternatively, the weights $\omega x$ and $\omega y$ may be changed in real time according to the running state or the like.

Figure 11:
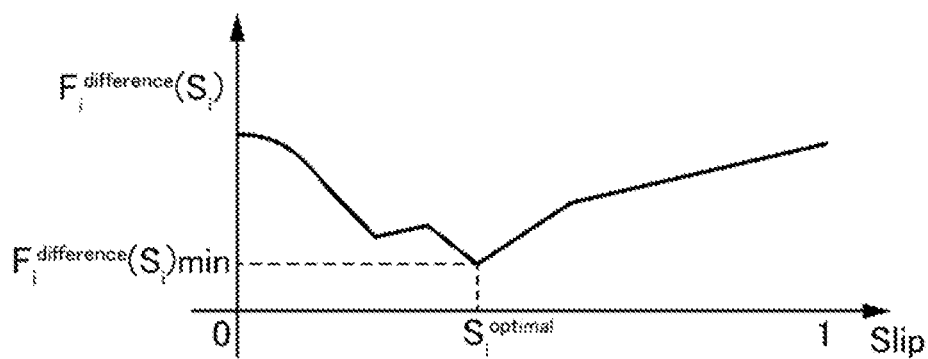
FIG. 11 illustrates one example of a minimum value of a total value of the first difference and the second difference with respect to each slip ratio.

In step S45, the VMCU 8 calculates the slip ratio Si at which the total value Fidifference(Si) matches the minimum value Fidifference(Si)min, and sets this value as the optimal slip ratio Sioptimal as illustrated in FIG. 11.

In step S5, the VMCU 8 sets the preset predetermined slip ratio as the optimal slip ratio Sioptimal.

Next, advantageous effects of the first embodiment will be described.

Figure 12:
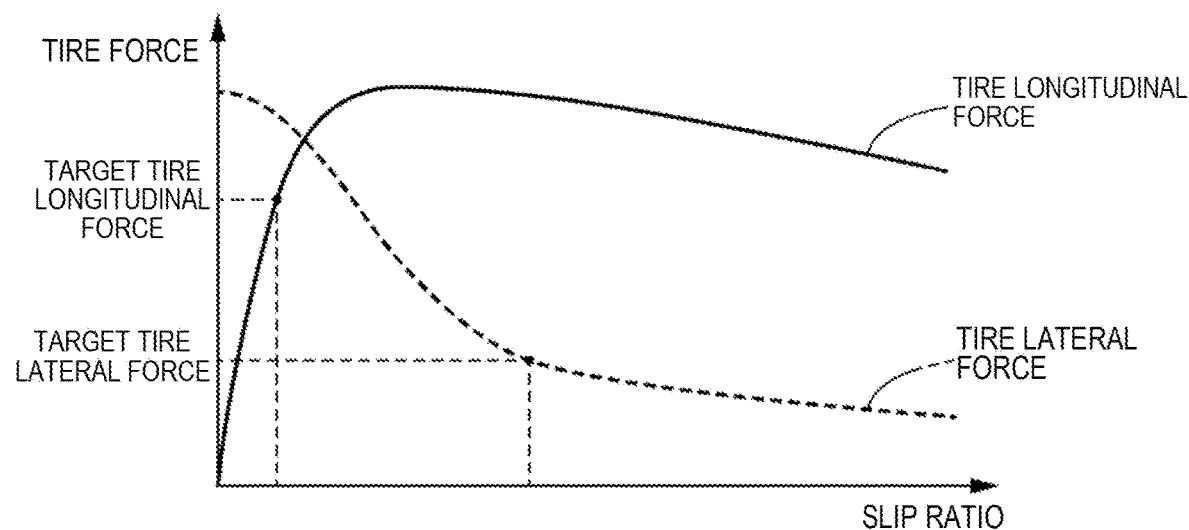
FIG. 12 illustrates one example of a slip ratio-tire lateral force characteristic and a slip ratio-tire longitudinal force characteristic.

FIG. 12 illustrates one example of the slip ratio-tire lateral force characteristic and the slip ratio-tire longitudinal force characteristic at some slip angle. As illustrated in FIG. 12, there is a difference between the tire lateral force characteristic and the tire longitudinal force characteristic with respect to the slip ratio, so that slip ratios respectively satisfying the target tire lateral force and the target tire longitudinal force rarely match each other.

Figure 13:
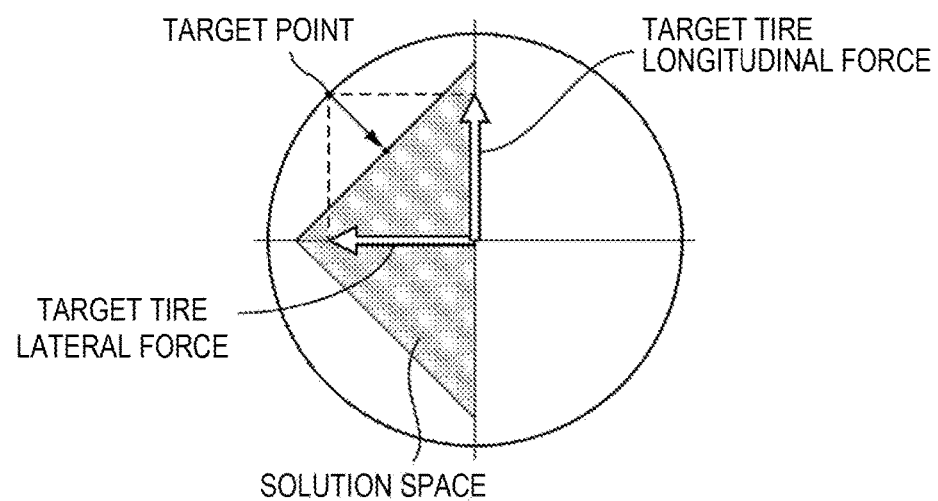
FIG. 13 illustrates one example of a tire longitudinal force and a tire lateral force realized by the optimal slip ratio.

Therefore, the optimal slip ratio calculation portion 26 according to the first embodiment sets, as the optimal slip ratio Sioptimal, the slip ratio at which the total value Fidifference(Si) of the first difference Fyidifference(Si), which is the absolute value of the difference between the target tire lateral force Fyitarget and the tire lateral force Fyi(Si), and the second difference Fxidifference(Si), which is the absolute value of the difference between the target tire longitudinal force Fxitarget and the tire longitudinal force Fxi(Si), is minimized. In other words, as illustrated in FIG. 13, the point closest to the target point can be searched for from a solution space even when it is impossible to realize the target point satisfying both the target tire lateral force and the target tire longitudinal force. The balance can be optimized between the target tire lateral force and the target tire longitudinal force by setting the slip ratio at this point as the optimal slip ratio.

The control of the lateral force and the longitudinal force of the vehicle especially on a low-μ road surface is extremely important for vehicles equipped with the autonomous driving function in light of ensuring robustness. The tire lateral force and the tire longitudinal force of each of the wheels can be accurately controlled regardless of the road surface μ (a road surface frictional coefficient between the tire and the road surface) by using the optimal slip ratio control according to the first embodiment. As a result, the lateral force and the longitudinal force of the vehicle can be controlled with improved accuracy, and therefore both the spin avoidance and the line traceability can be realized at the same time.

Now, the conventional sideslip prevention device is configured to feed back a disturbance in the vehicle behavior and control a slip in a direction for reducing the slip ratio of the wheel. On the other hand, the optimal slip ratio control according to the first embodiment is configured to control a slip so as to optimize the balance between the target tire lateral force and the target tire longitudinal force in a state that the vehicle behavior is not disturbed, i.e., in a state that the sideslip prevention device is not in operation. Therefore, the optimal slip ratio control according to the first embodiment may increase the slip ratio of the wheel depending on the optimal slip ratio even in such a scene that the conventional sideslip prevention device would not increase the slip ratio.

The optimal slip ratio calculation portion 26 weights the first difference Fyidifference(Si) and the second difference Fxidifference(Si) with use of ωy and ωx satisfying ωx+ωy=1, and sets the slip ratio at which the total value Fidifference(Si) after the weighting is minimized as the optimal slip ratio Sioptimal. This allows the vehicle to take an appropriate action according to the vehicle characteristic and the running state. For example, adjusting ωx and ωy to values preset based on the vehicle specifications allows the vehicle to take an appropriate action according to the vehicle characteristic. Further, variably controlling ωx and ωy according to the running state of the vehicle allows the vehicle to take an appropriate action according to the running state.

The tire lateral force maximum value calculation portion 23 calculates the normalized tire lateral force normalizeFyi based on the current slip ratio Sicurrent with use of the slip ratio-tire lateral force normalization characteristic map, and calculates the tire lateral force maximum value Fyimax based on the normalized tire lateral force normalizeFyi and the current tire lateral force Fyicurrent. The acquisition of the tire lateral force maximum value Fyimax allows the current slip ratio-tire lateral force characteristic to be acquired from the slip ratio-tire lateral force normalization characteristic map. The tire longitudinal force maximum value calculation portion 25 calculates the tire longitudinal force maximum value Fximax based on the tire lateral force maximum value Fyimax, hypothetically assuming that the tire frictional circle is a perfect circle. The acquisition of the tire longitudinal force maximum value Fximax allows the current slip ratio-tire longitudinal force characteristic to be acquired from the slip ratio-tire longitudinal force normalization characteristic map. Therefore, in the first embodiment, the correlative relationship between the current slip ratio and the tire force (the tire lateral force and the tire longitudinal force) can be acquired without estimating a wheel load of each of the wheels and the road surface μ.

The tire lateral force maximum value calculation portion 23 sets the tire lateral force maximum value stored value stored in the tire lateral force maximum value storage portion 24 as the tire lateral force maximum value Fyimax, when the tire lateral force calculated by the tire lateral force calculation portion 22 falls outside the normal range. Due to this configuration, the optimal slip ratio Sioptimal can be calculated even when an abnormality has occurred in the vehicle behavior sensor unit 6, and therefore the autonomous driving can continue.

The optimal slip ratio calculation portion 26 sets the preset predetermined slip ratio as the optimal slip ratio Sioptimal when the slip ratio calculated by the slip ratio calculation portion 21 falls outside the normal range. As a result, the target tire lateral force and the target tire longitudinal force can be prevented from being unbalanced therebetween due to the inappropriate optimal slip ratio Sioptical.

The actuator output portion 8e generates the braking and driving force instructions for achieving the optimal slip ratio Sioptimal at each of the wheels. As a result, the optimal slip ratio Sioptimal can be achieved at all the wheels, and therefore both the spin avoidance and the line traceability can be realized at the same time.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention, if any. Further, the individual components described in the claims and the specification can be arbitrarily combined or omitted within a range that allows them to remain capable of achieving at least a part of the above-described objects or producing at least a part of the above-described advantageous effects.

The present invention is applicable as long as there is at least one wheel as the wheel for which the optimal slip ratio control is employed. For example, the VMCU 8 may select a wheel having a largest frictional circle among the four wheels and employ the optimal slip ratio control for this wheel. Alternatively, the optimal slip ratio control may be employed for only the front wheel or the rear wheel.

The vehicle control system 1 may be configured in such a manner that at least one or all of the running position control portion 8a, the vehicle posture control portion 8b, and the tire force control portion 8c are provided outside the VMCU 8 (in the ADCU 7 or another external control unit).

The vehicle control system 1 may be configured in such a manner that at least one or all of the slip ratio calculation portion 21, the tire lateral force calculation portion 22, the tire lateral force maximum value calculation portion 23, the tire lateral force maximum value storage portion 24, or the tire longitudinal force maximum value calculation portion 25 are provided outside the VMCU 8 (in the ADCU 7 or another external control unit).

The tire lateral force and the slip ratio may be calculated by an arbitrary method.

In the following description, other configurations recognizable from the above-described embodiment will be described.

A vehicle control apparatus, in one configuration thereof, includes a target tire lateral force input portion configured to receive an input of a target tire lateral force that should be generated on a wheel portion of a vehicle. The target tire lateral force is acquired based on a set route that the vehicle should run. The vehicle control apparatus further includes a target tire longitudinal force input portion configured to receive an input of a target tire longitudinal force that should be generated on the wheel portion. The target tire longitudinal force is acquired based on the set route. The vehicle control apparatus further includes an actuator output portion configured to output an instruction for achieving an optimal slip ratio corresponding to a minimum value of a sum of a first difference and a second difference to an actuator regarding braking/driving of the vehicle. The first difference is a difference between a tire lateral force and the target tire lateral force with respect to an arbitrary slip ratio in a correlative relationship between a slip ratio and the tire lateral force of a tire of the wheel portion. The second difference is a difference between a tire longitudinal force and the target tire longitudinal force with respect to the arbitrary slip ratio in a correlative relationship between the slip ratio and the tire longitudinal force.

According to another configuration, in the above-described configuration, the vehicle control apparatus further includes a maximum tire lateral force input portion configured to receive an input of a maximum tire lateral force that can be generated on the wheel portion. The maximum tire lateral force is acquired based on the tire lateral force generated on the wheel portion and the slip ratio that are acquired based on vehicle behavior information detected by a vehicle behavior detection portion configured to detect a behavior of the vehicle. The vehicle control apparatus further includes a maximum tire longitudinal force input portion configured to receive an input of a maximum tire longitudinal force that can be generated on the wheel portion. The maximum tire longitudinal force is acquired based on the maximum tire lateral force. The actuator output portion acquires the correlative relationship between the slip ratio and the tire lateral force based on the maximum tire lateral force and acquires the correlative relationship between the slip ratio and the tire longitudinal force based on the maximum tire longitudinal force.

According to another configuration, in any of the above-described configurations, the optimal slip ratio is acquired by adding a first weighted difference, which is the first difference with a first weight applied thereto, and a second weighted difference, which is the second difference with a second weight applied thereto.

According to further another configuration, in any of the above-described configurations, assuming that cox represents the first weight and coy represents the second weight, the following equation is satisfied, $\omega x + \omega y = 1$.

According to further another configuration, in any of the above-described configurations, the first weight and the second weight are preset based on vehicle specifications.

According to further another configuration, in any of the above-described configurations, the first weight and the second weight are changed according to a running state of the vehicle.

According to further another configuration, in any of the above-described configurations, the vehicle control apparatus further includes a stored maximum tire lateral force input portion configured to receive an input of a stored maximum tire lateral force stored in a maximum tire lateral force storage portion configured to store the maximum tire lateral force. When an abnormality has occurred in the vehicle behavior detection portion, the stored maximum tire lateral force is input to the stored maximum tire lateral force input portion, and a stored maximum tire longitudinal force acquired based on the stored maximum tire lateral force is input to the maximum tire longitudinal force input portion instead of the maximum tire lateral force.

According to further another configuration, in any of the above-described configurations, when an abnormality has occurred in the vehicle behavior detection portion, the actuator output portion outputs an instruction for achieving a predetermined slip ratio acquired based on the target tire longitudinal force input to the target tire longitudinal force input portion to the actuator instead of the instruction for achieving the optimal slip ratio.

According to further another configuration, in any of the above-described configurations, the actuator output portion outputs an instruction for achieving the optimal slip ratio on all wheels of the wheel portion to the actuator.

According to further another configuration, in any of the above-described configurations, the actuator output portion outputs an instruction for achieving the optimal slip ratio on at least one wheel of the wheel portion to the actuator.

Further, from another aspect, a vehicle control method, in one configuration thereof, includes receiving inputs of a target tire lateral force and a target tire longitudinal force that should be generated on a wheel portion of a vehicle. The target tire lateral force and the target tire longitudinal force are acquired based on a set route that the vehicle should run. The vehicle control method further includes outputting an instruction for achieving an optimal slip ratio corresponding to a minimum value of a sum of a first difference and a second difference to an actuator regarding braking/driving of the vehicle. The first difference is a difference between a tire lateral force and the target tire lateral force with respect to an arbitrary slip ratio in a correlative relationship between a slip ratio and the tire lateral force of a tire of the wheel portion. The second difference is a difference between a tire longitudinal force and the target tire longitudinal force with respect to the arbitrary slip ratio in a correlative relationship between the slip ratio and the tire longitudinal force.

According to another configuration, in the above-described configuration, the vehicle control method further includes receiving an input of a maximum tire lateral force that can be generated on the wheel portion. The maximum tire lateral force is acquired based on the tire lateral force generated on the wheel portion and the slip ratio that are acquired based on detected vehicle behavior information. The vehicle control method further includes receiving an input of a maximum tire longitudinal force that can be generated on the wheel portion. The maximum tire longitudinal force is acquired based on the maximum tire lateral force. The vehicle control method further includes acquiring the correlative relationship between the slip ratio and the tire lateral force based on the maximum tire lateral force, and acquiring the correlative relationship between the slip ratio and the tire longitudinal force based on the maximum tire longitudinal force.

According to another configuration, in any of the above-described configurations, the optimal slip ratio is acquired by adding a first weighted difference, which is the first difference with a first weight applied thereto, and a second weighted difference, which is the second difference with a second weight applied thereto.

According to further another configuration, in any of the above-described configurations, assuming that ωx represents the first weight and ωy represents the second weight, the following equation is satisfied, ωx+ωy=1.

From further another aspect, a vehicle control system, in one configuration thereof, includes a vehicle behavior detection portion configured to detect a behavior of a vehicle, a tire lateral force calculation portion configured to acquire a tire lateral force generated on a wheel portion of the vehicle based on vehicle behavior information detected by the vehicle behavior detection portion, a slip ratio calculation portion configured to acquire a slip ratio of the wheel portion based on the vehicle behavior information, a target tire lateral force calculation portion configured to acquire a target tire lateral force that should be generated on the wheel portion based on a set route that the vehicle should run, a target tire longitudinal force calculation portion configured to acquire a target tire longitudinal force that should be generated on the wheel portion based on the set route, a tire lateral force difference calculation portion configured to acquire a first difference, which is a difference between the tire lateral force and the target tire lateral force with respect to an arbitrary slip ratio in a correlative relationship between the slip ratio and the tire lateral force of a tire of the wheel portion, a tire longitudinal force difference calculation portion configured to acquire a second difference, which is a difference between the tire longitudinal force and the target tire longitudinal force with respect to the arbitrary slip ratio in a correlative relationship between the slip ratio and the tire longitudinal force, an optimal slip ratio calculation portion configured to acquire an optimal slip ratio corresponding to a minimum value of a sum of the first difference and the second difference, and an actuator output portion configured to output an instruction for achieving the optimal slip ratio to an actuator regarding braking/driving of the vehicle.

According to another configuration, in the above-described configuration, the vehicle control system further includes a maximum tire lateral force calculation portion configured to acquire a maximum tire lateral force that can be generated on the wheel portion based on the tire lateral force acquired by the tire lateral force calculation portion and the slip ratio acquired by the slip ratio calculation portion, and a maximum tire longitudinal force calculation portion configured to acquire a maximum tire longitudinal force that can be generated on the wheel portion based on the maximum tire lateral force. The tire lateral force difference calculation portion acquires the correlative relationship between the slip ratio and the tire lateral force based on the maximum tire lateral force, and the tire longitudinal force difference calculation portion acquires the correlative relationship between the slip ratio and the tire longitudinal force based on the maximum tire longitudinal force.

According to another configuration, in any of the above-described configurations, the optimal slip ratio is acquired by adding a first weighted difference, which is the first difference with a first weight applied thereto, and a second weighted difference, which is the second difference with a second weight applied thereto.

According to further another configuration, in any of the above-described configurations, assuming that ωx represents the first weight and ωy represents the second weight, the following equation is satisfied, ωx+ωy=1.

The present application claims priority under the Paris Convention to Japanese Patent Application No. 2017-180314 filed on Sep. 20, 2017. The entire disclosure of Japanese Patent Application No. 2017-180314 filed on Sep. 20, 2017 including the specification, the claims, the drawings, and the abstract is incorporated herein by reference in its entirety.

REFERENCE SIGN LIST 1 vehicle control system
2 engine (actuator)
6 vehicle behavior sensor unit (vehicle behavior detection portion)
7 autonomous driving control unit
8 vehicle motion control unit
8c tire force control portion (target tire lateral force calculation portion and target tire longitudinal force calculation portion)
8d wheel slip control portion
8e actuator output portion
9 brake unit (actuator)
21 slip ratio calculation portion
22 tire lateral force calculation portion
26 optimal slip ratio calculation portion
26a target tire lateral force input portion
26b target tire longitudinal force input portion
26f tire lateral force difference calculation portion
26g tire longitudinal force difference calculation portion

The invention claimed is:

1. A vehicle control apparatus comprising:
a vehicle motion control apparatus that is configured to:
receive an input of a target tire lateral force that should be generated on a wheel of a vehicle, the target tire lateral force being acquired based on a set route that the vehicle should run;
receive an input of a target tire longitudinal force that should be generated on the wheel, the target tire longitudinal force being acquired based on the set route;
output an instruction that achieves an optimal slip ratio corresponding to a minimum value of a sum of a first difference and a second difference to an actuator regarding braking/driving of the vehicle, the first difference being a difference between a tire lateral force and the target tire lateral force with respect to an arbitrary slip ratio in a correlative relationship between a slip ratio and the tire lateral force of a tire of the wheel, the second difference being a difference between a tire longitudinal force and the target tire longitudinal force with respect to the arbitrary slip ratio in a correlative relationship between the slip ratio and the tire longitudinal force;
receive an input of a maximum tire lateral force generated on the wheel, the maximum tire lateral force being acquired based on the tire lateral force generated on the wheel and the slip ratio that are acquired based on vehicle behavior information detected by a vehicle behavior sensor that is configured to detect a behavior of the vehicle; and receive an input of a maximum tire longitudinal force generated on the wheel, the maximum tire longitudinal force being acquired based on the maximum tire lateral force, wherein the vehicle motion control apparatus is also configured to acquire the correlative relationship between the slip ratio and the tire lateral force based on the maximum tire lateral force, and is also configured to acquire the correlative relationship between the slip ratio and the tire longitudinal force based on the maximum tire longitudinal force, and the first difference is a difference between the tire lateral force corresponding to each slip ratio calculated using a slip ratio-tire lateral force characteristic normalization map and the target tire lateral force, and the second difference is a difference between the tire longitudinal force corresponding to each slip ratio calculated using a slip ratio-tire longitudinal force characteristic normalization map and the target tire longitudinal force and control of the optimal slip ratio corresponds to the minimum value of a sum of the first difference and the second difference is performed in a state that the slip ratio falls within a range in which vehicle behavior is not disturbed.

2. The vehicle control apparatus according to claim 1, wherein the optimal slip ratio is acquired by adding a first weighted difference, which is the first difference with a first weight applied thereto, and a second weighted difference, which is the second difference with a second weight applied thereto.

3. The vehicle control apparatus according to claim 2, wherein, assuming that $\omega x$ represents the first weight and $\omega y$ represents the second weight, the following equation is satisfied, $$\omega x + \omega y = 1.$$

4. The vehicle control apparatus according to claim 3, wherein the first weight and the second weight are preset based on vehicle specifications.

5. The vehicle control apparatus according to claim 3, wherein the first weight and the second weight are changed according to a running state of the vehicle.

6. The vehicle control apparatus according to claim 1, wherein the vehicle motion control apparatus is also configured to receive an input of a stored maximum tire lateral force stored in a maximum tire lateral force storage portion configured to store the maximum tire lateral force, wherein, when an abnormality has occurred in the vehicle behavior sensor, the stored maximum tire lateral force is input to the stored maximum tire lateral force, and a stored maximum tire longitudinal force acquired based on the stored maximum tire lateral force is input to the maximum tire longitudinal force instead of the maximum tire lateral force.

7. The vehicle control apparatus according to claim 1, wherein, when an abnormality has occurred in the vehicle behavior sensor, the vehicle motion control apparatus outputs an instruction that achieves a predetermined slip ratio acquired based on the target tire longitudinal force instead of the instruction that achieves the optimal slip ratio.

8. The vehicle control apparatus according to claim 1, wherein the vehicle motion control apparatus outputs an instruction that achieves the optimal slip ratio on all wheels of the wheel to the actuator.

9. The vehicle control apparatus according to claim 1, wherein the vehicle motion control apparatus outputs an instruction that achieves the optimal slip ratio on at least one wheel of the wheel to the actuator.

10. A vehicle control method comprising:

receiving inputs of a target tire lateral force and a target tire longitudinal force that should be generated on a wheel of a vehicle, the target tire lateral force and the target tire longitudinal force being acquired based on a set route that the vehicle should run;

outputting an instruction that achieves an optimal slip ratio corresponding to a minimum value of a sum of a first difference and a second difference to an actuator regarding braking/driving of the vehicle, the first difference being a difference between a tire lateral force and the target tire lateral force with respect to an arbitrary slip ratio in a correlative relationship between a slip ratio and the tire lateral force of a tire of the wheel, the second difference being a difference between a tire longitudinal force and the target tire longitudinal force with respect to the arbitrary slip ratio in a correlative relationship between the slip ratio and the tire longitudinal force;

receiving an input of a maximum tire lateral force that can be generated on the wheel, the maximum tire lateral force being acquired based on the tire lateral force generated on the wheel and the slip ratio that are acquired based on detected vehicle behavior information;

receiving an input of a maximum tire longitudinal force that can be generated on the wheel, the maximum tire longitudinal force being acquired based on the maximum tire lateral force;

acquiring the correlative relationship between the slip ratio and the tire lateral force based on the maximum tire lateral force; and acquiring the correlative relationship between the slip ratio and the tire longitudinal force based on the maximum tire longitudinal force, wherein the first difference is a difference between the tire lateral force corresponding to each slip ratio calculated using a slip ratio-tire lateral force characteristic normalization map and the target tire lateral force, and the second difference is a difference between the tire longitudinal force corresponding to each slip ratio calculated using a slip ratio-tire longitudinal force characteristic normalization map and the target tire longitudinal force and control of the optimal slip ratio corresponds to the minimum value of a sum of the first difference and the second difference is performed in a state that the slip ratio falls within a range in which vehicle behavior is not disturbed.

11. The vehicle control method according to claim 10, wherein the optimal slip ratio is acquired by adding a first weighted difference, which is the first difference with a first weight applied thereto, and a second weighted difference, which is the second difference with a second weight applied thereto.

12. The vehicle control method according to claim 11, wherein, assuming that ωx represents the first weight and ωy represents the second weight, the following equation is satisfied, ωx+ωy=1.

13. A vehicle control system comprising:
a vehicle behavior sensor configured to detect a behavior of a vehicle; and
a vehicle motion control apparatus that is configured to:
acquire a tire lateral force generated on a wheel of the vehicle based on vehicle behavior information detected by the vehicle behavior sensor;
acquire a slip ratio of the wheel based on the vehicle behavior information;
acquire a target tire lateral force that should be generated on the wheel based on a set route that the vehicle should run;
acquire a target tire longitudinal force that should be generated on the wheel based on the set route;
acquire a first difference, the first difference being a difference between the tire lateral force and the target tire lateral force with respect to an arbitrary slip ratio in a correlative relationship between the slip ratio and the tire lateral force of a tire of the wheel;
acquire a second difference, the second difference being a difference between the tire longitudinal force and the target tire longitudinal force with respect to the arbitrary slip ratio in a correlative relationship between the slip ratio and the tire longitudinal force;
acquire an optimal slip ratio corresponding to a minimum value of a sum of the first difference and the second difference;
output an instruction that achieves the optimal slip ratio to an actuator regarding braking/driving of the vehicle;
acquire a maximum tire lateral force generated on the wheel based on the tire lateral force acquired by the tire lateral force calculation portion and the acquired slip ratio; and
acquire a maximum tire longitudinal force generated on the wheel based on the maximum tire lateral force, wherein
the vehicle motion control apparatus is also configured to acquire the correlative relationship between the slip ratio and the tire lateral force based on the maximum tire lateral force, and acquire the correlative relationship between the slip ratio and the tire longitudinal force based on the maximum tire longitudinal force,
the first difference is a difference between the tire lateral force corresponding to each slip ratio calculated using a slip ratio-tire lateral force characteristic normalization map and the target tire lateral force, and the second difference is a difference between the tire longitudinal force corresponding to each slip ratio calculated using a slip ratio-tire longitudinal force characteristic normalization map and the target tire longitudinal force and
control of the optimal slip ratio corresponds to the minimum value of a sum of the first difference and the second difference is performed in a state that the slip ratio falls within a range in which vehicle behavior is not disturbed.

14. The vehicle control system according to claim 13, wherein the optimal slip ratio is acquired by adding a first weighted difference, which is the first difference with a first weight applied thereto, and a second weighted difference, which is the second difference with a second weight applied thereto.

15. The vehicle control system according to claim 14, wherein, assuming that ωx represents the first weight and ωy represents the second weight, the following equation is satisfied, ωx+ωy=1.

* * * * *